United States Patent [19]

Furuya et al.

[11] 4,388,803
[45] Jun. 21, 1983

[54] SYSTEM FOR RAPIDLY WARMING UP CATALYTIC CONVERTER PROVIDED TO AUTOMOTIVE INTERNAL COMBUSTION ENGINE

[75] Inventors: Katuji Furuya, Musashimurayama; Tokuzo Yago, Tokyo, both of Japan

[73] Assignee: Nissan Motor Company, Limited, Yokohama, Japan

[21] Appl. No.: 281,875

[22] Filed: Jul. 9, 1981

[30] Foreign Application Priority Data

Jul. 10, 1980 [JP] Japan ................................. 55-94178

[51] Int. Cl.³ .............................................. F02P 5/04
[52] U.S. Cl. ..................................... 60/284; 123/401; 123/407; 123/409
[58] Field of Search .................. 60/284; 123/401, 407, 123/409, 421, 424

[56] References Cited

U.S. PATENT DOCUMENTS

| | | | |
|---|---|---|---|
| 3,486,491 | 12/1969 | White | 123/407 |
| 3,776,205 | 12/1973 | Maruoka | 60/284 |
| 3,800,759 | 4/1974 | Cedar | 123/407 |
| 4,051,823 | 10/1977 | Mogi | 123/407 |
| 4,351,296 | 9/1982 | Kayanuma | 123/409 |

Primary Examiner—Douglas Hart
Attorney, Agent, or Firm—Schwartz, Jeffery, Schwaab, Mack, Blumenthal & Koch

[57] ABSTRACT

A system for rapidly warming up a catalytic converter provided to an automotive internal combustion engine to purify the exhaust gas. The system includes a vacuum-operated device to increase the opening degree of the throttle valve by a predetermined degree to thereby increase the quantity of the exhaust gas and another vacuum-operated device to retard the ignition timing of the engine to a predetermined extent to thereby raise the temperature of the exhaust gas. The two devices are connected by a vacuum passage to the intake passage of the engine at a section downstream of the throttle valve in series, and an electromagnetic valve renders the vacuum passage effective to thereby actuate the vacuum-operated devices only when the engine is idling under cold condition. Because of the series connection of the two devices, an intake vacuum is applied to the two devices in desirable sequence.

6 Claims, 6 Drawing Figures

SYSTEM FOR RAPIDLY WARMING UP CATALYTIC CONVERTER PROVIDED TO AUTOMOTIVE INTERNAL COMBUSTION ENGINE

BACKGROUND OF THE INVENTION

1. Field of the Invention

The present invention relates to a system for rapidly warming up a catalytic converter provided to an automotive internal combustion engine by increasing the throttle opening degree and retarding the ignition timing immediately after starting of the engine.

2. Description of the Prior Art

Currently, many internal combustion engines in automobiles are equipped with a catalytic converter for purifying the engine exhaust gas. Almost every catalyst now used for this purpose displays its ability to the extent of practical satisfaction only when it is maintained at a sufficiently high temperature. While the engine is operating under normal conditions, the temperature of the exhaust gas is high enough to allow the catalyst in the catalytic converter to work satisfactorily efficiently. However, the catalyst cannot work satisfactorily when the exhaust gas temperature is relatively low as is usual for some time immediately after cold-starting of the engine. Accordingly, it becomes necessary to provide the catalytic converter or the engine with a warm-up means for promoting warm-up of the catalyst in the catalytic converter to render the catalyst effective as soon as possible after starting of the engine.

As a practical example of hitherto proposed warm-up means for automotive catalytic converters, there is a system which is so constructed as to promote warm-up of the catalyst during idling of the engine immediately after cold-starting by slightly increasing the opening degree of the throttle valve with the intention of supplying an increased quantity of exhaust gas to the catalytic converter and at the same time slightly retarding the ignition timing in order to raise the temperature of the exhaust gas. Usually, a throttle opening device and an ignition timing retarding device in this system are both of a vacuum-operated type having a flexible diaphragm with a vacuum chamber defined on one side of the diaphragm, and these two devices are individually connected to the intake passage at a section downstream of the throttle valve such that vacuum created in the intake manifold can simultaneously be applied to the two devices. An electromagnetic valve is used to admit air into the vacuum passages for these two devices during normal operation of the engine and block the admission of air while the engine is idling and the temperature of the engine or the engine cooling water is below a predetermined temperature.

In practical operation of this warm-up system, however, the throttle opening device and the ignition timing retarding device often fail to simultaneously come into operation, although the electromagnetic valve causes simultaneous application of vacuum to the two devices, because of inevitable differences in operating characteristics between these two devices attributed to dispersions of quality in mass production and variations of the degree of deterioration by aging. For example, a synthetic rubber used as the material of the diaphragms in the vacuum-operated devices is liable to undergo a change in its hardness with the lapse of time, and the rate of the change is considerably variable depending on various factors such as the processing conditions, environmental temperatures, etc. Therefore, there is a strong possibility that the ignition timing retarding device comes into action earlier than the throttle opening device, causing the engine to stall or become unstable. Also it is probable that the action of the throttle opening device precedes the action of the ignition timing retarding device. This sequence is rather favorable insofar as the time lag is adequately small, but when the time lag is too great there occurs unwanted increase in the engine speed with augmentation of noise. When the engine is warmed up to the predetermined temperature and/or the gears of the transmission are shifted from the neutral position, it is not certain whether the two vacuum-operated devices become simultaneously inoperative or either of them becomes inoperative precedent to the other, despite desirableness of the simultaneous reaction of the two devices or slightly earlier reaction of the throttle opening device.

SUMMARY OF THE INVENTION

It is an object of the invention to provide a system for rapidly warming up a catalytic converter provided to an internal combustion engine in an automobile, which system is fundamentally resembling to the above described warm-up system but is improved such that when vacuum is applied to the throttle opening device and the ignition timing retarding device the former device comes into operation slightly earlier than the latter, and that when the application of the vacuum is terminated the throttle opening device becomes inoperative simultaneously with or slightly earlier than the ignition timing retarding device.

A system according to the invention for rapidly warming up a catalytic converter, which is provided to an exhaust passage of an automotive internal combustion engine including an intake passage with a throttle valve therein to purify the exhaust gas, comprises: throttle opening means for increasing the opening degree of the throttle valve by a predetermined value only when a vacuum is applied to the throttle opening means; ignition timing retarding means for retarding the ignition timing of the engine to a predetermined extent only when a vacuum is applied to the ignition timing retarding means; a vacuum passage which connects the ignition timing retarding means to the intake passage at a section downstream of the throttle valve via the throttle opening means; an electromagnetic valve provided to the vacuum passage at a section between the intake passage and the throttle opening means such that an intake vacuum produced in the intake passage by the operation of the engine is applied through the vacuum passage to the throttle opening means and the ignition timing retarding means only while the electromagnetic valve is electrically actuated; an engine-temperature switch which closes only when the temperature of the engine is below a predetermined temperature; and a gear-position switch which closes only when the engine is in idling operation, the engine-temperature switch and the gear-position switch being included in a circuit for actuation of the electromagnetic valve and connected with each other such that the electromagnetic valve is actuated only while both the engine-temperature switch and the gear-position switch are in the closed state.

The essential feature of this warm-up system is that the throttle opening means and the ignition timing retarding means are connected to the aforementioned section of the intake passage by the vacuum passage in series. This has the effect that when the electromagnetic valve is actuated, the intake vacuum is applied to the ignition timing retarding means with a suitable delay after the application of the intake vacuum to the throttle opening means whereby the latter means starts its operation earlier than the former means to an allowable extent and that when the electromagnetic valve is deenergized, the application of the intake vacuum to the ignition timing retarding means is terminated with a suitable delay after the termination of the application of the intake vacuum to the throttle opening means whereby the latter means terminates its operation earlier than the former means to an allowable extent.

As a typical and preferable example, the throttle opening means includes a vacuum-operated device having a flexible diaphragm which partitions the interior of a housing into a vacuum chamber and an atmospheric pressure chamber and is connected to the throttle valve by a linkage such that the opening degree of the throttle valve is increased when this diaphragm deflects toward the vacuum chamber. In this case, the ignition timing retarding means too includes a vacuum-operated device of the same type with its diaphragm connected by a linkage to a usual distributor for ignition of the engine such that the ignition timing is retarded when the diaphragm deflects toward the vacuum chamber. The vacuum chambers of these two devices are connected by the aforementioned vacuum passage to the intake passage.

Where it is desired to render the throttle opening means and the ignition timing retarding means inactive simultaneously, the desire can be met by additional provision of an air-admitting passage which effects direct communication of the vacuum chamber of the ignition timing retarding means with the atmosphere when the electromagnetic valve is deenergized.

DESCRIPTION OF THE PREFERRED EMBODIMENTS

Figure 1:
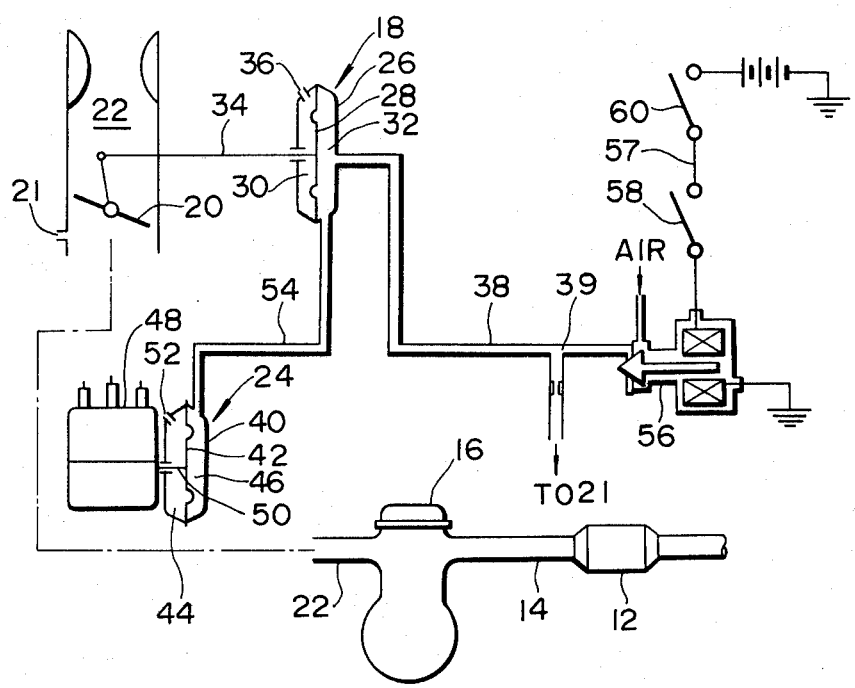
FIG. 1 is a diagrammatic illustration of a preferred embodiment of a warm-up system according to the invention.

FIG. 1 shows a fundamental construction of a system according to the invention for rapid warm-up of a catalytic converter 12 provided to an exhaust passage 14 of an automotive internal combustion engine 16. This system has a vacuum-operated device 18 to temporarily increase the opening degree of a throttle valve 20 disposed in an intake passage 22 of the engine 16, and another vacuum-operated device 24 to temporarily retard the ignition timing of the engine 16. The throttle opening device 18 has a flexible diaphragm 28 which divides the interior of a housing 26 of the device 18 into an atmospheric pressure chamber 30 communicating with the atmosphere through an opening 36 and a vacuum chamber 32 which is connected by a vacuum passage 38 to a port 21 of the intake passage 22 at a section downstream of the throttle valve 20. The diaphragm 28 is connected to the throttle valve 20 by a linkage 34 such that the throttle opening degree increases by a predetermined value when the diaphragm 28 deflects towards the vacuum chamber 32 by the action of an intake vacuum applied to this chamber 32.

The ignition timing retarding device 24 is of the same type as the throttle opening device 18. That is, a flexible diaphragm 42 divides the interior of a housing 40 of this device 24 into a vacuum chamber 46 and an atmospheric pressure chamber 44 communicating with the atmosphere through an opening 52. A vacuum passage 54 connects the vacuum chamber 46 to the vacuum chamber 32 of the throttle opening device 18, so that the two devices 18 and 24 are connected to the port 21 of the intake passage 22 in series with each other. The diaphragm 42 is connected to a distributor 48 of the ignition system for the engine 16 by a linkage 50 such that the ignition timing is retarded to a predetermined extent when the diaphragm 42 deflects towards the vacuum chamber 46 by the action of the intake vacuum applied to the chamber 46.

The vacuum passage 38 has a port 39 opening to the atmosphere at a section relatively close to the throttle opening device 18, and there is an electromagnetic valve 56 arranged so as to close the port 39 while the solenoid of this valve 56 is in the energized state. An electric circuit 57 for energization of the solenoid includes a normally-open switch 58 which closes only when the temperature of the engine cooling water as an indication of the temperature of the engine 16 is below a predetermined temperature, and another normally-open switch 60 which is connected in series with the temperature-sensitive switch 58 and closes only when the gears of the transmission (not shown) for the engine 16 are in the neutral position, that is, when the engine 16 is idling. Accordingly, the electromagnetic valve 56 is actuated to close the port 39 and allow the vacuum passages 38 and 54 to transmit the intake vacuum therethrough only when the two switches 58 and 60 are both in the closed state. In other words, the intake vacuum cannot be applied to the two vacuum-operated devices 18 and 24 while either, or both, of these two switches 58 and 60 is in the open state.

The warm-up system of FIG. 1 operates in the following manner.

When the engine 16 is started in a cold state with the transmission gears in the neutral position, the two switches 58 and 60 both remain closed to cause the electromagnetic valve 56 to block the communication of the vacuum passage 38 with the atmosphere. As an intake vacuum is created in the aforementioned section of the intake passage 22 by the operation of the engine 16, the intake vacuum is transmitted through the vacuum passage 38 and first acts on the diaphragm 28 of the throttle opening device 18 to increase the opening degree of the throttle valve 20 by the pedetermined value to thereby increase the quantity of exhaust gas flowing into the catalytic converter 12. With some time lag, the vacuum transmitted through the vacuum passage 54 acts on the diaphragm 42 of the ignition timing retarding device 24 to retard the ignition timing to the predetermined extent to thereby raise the temperature of the exhaust gas.

The increase in the quantity and the rise in the temperature of the exhaust gas have a joint effect of promoting heating of the catalyst in the catalytic converter 12. In this regard, this warm-up system serves the same function as the conventional warm-up system described hereinbefore. In the system of FIG. 1, however, the retardation of the ignition timing is preceded by the increase in the throttle opening degree and commences after an adequate delay as the effect of the connection of the ignition timing retarding device 24 to the intake passage 22 via the throttle opening device 18. Accordingly, there is no possibility of the operation of this warm-up system causing stalling or unstable running of the engine 16 by retarding the ignition timing immediately after starting of the engine 16 while the throttle opening degree is not yet increased.

The temperature-sensitive switch 58 opens when the temperature of the engine cooling water reaches the predetermined temperature, and the gear position switch 60 opens when the transmission gears are shifted from the neutral position irrespective of the state of the temperature-sensitive switch 58. Upon opening of either or both of the two switches 58 and 60, the electromagnetic valve 56 opens to allow the atmospheric air to flow into the vacuum passage 38 through the port 39. Naturally, the atmospheric pressure acts first on the throttle opening device 18 and then on the ignition timing retarding device 24 with an adequate delay, so that a normal ignition timing is resumed after reverting of the throttle opening degree to the normal degree. Therefore, the termination of operation of the warm-up system is not accompanied by misfiring in the engine 16 or unstable operation of the engine 16 by any other cause even when the transmission gears are shifted from the neutral position before sufficient rise of the engine temperature.

An adequate delay can be provided in the actuation and disabling of the ignition timing retarding device 24 by appropriately determining the length and effective cross-sectional area of the vacuum passage 54 as well as the volumes of the vacuum chambers 32 and 46.

Figure 2:
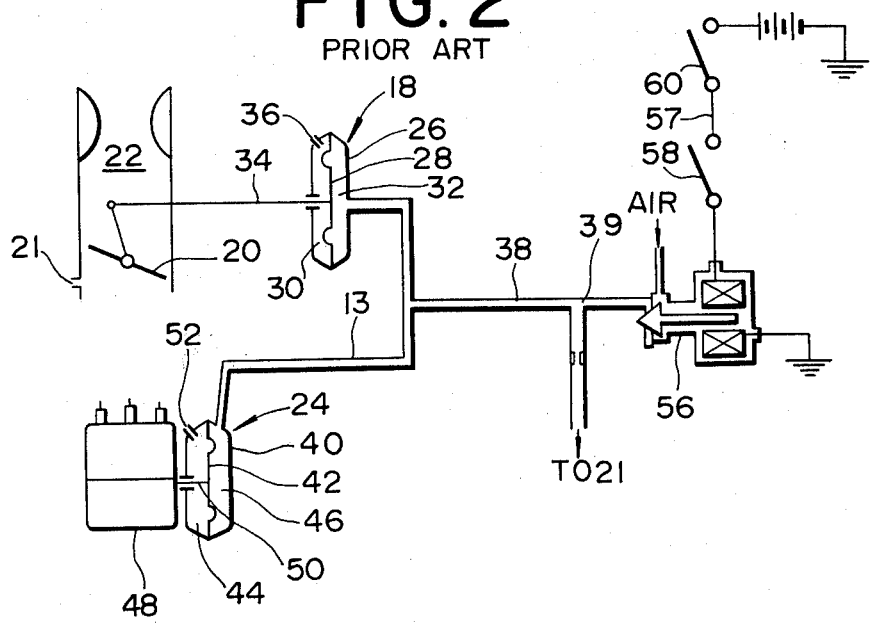
FIG. 2 is a diagrammatic illustration of a known warm-up system.

FIG. 2 illustrates the warm-up system proposed heretofore and described in the introductory part of the present specification. In FIG. 2 (and also in the subsequent FIGS. 3 to 5), illustration of the engine 16, exhaust passage 14 and catalytic converter 12 is omitted for simplification, and similar elements are designated by the same reference numerals.

A sole difference of the warm-up system of FIG. 2 from the system of FIG. 1 resides in that the vacuum chamber 46 of the ignition timing retarding device 24 is connected to the port 21 of the intake passage 22 through a vacuum passage 13 branching off from the vacuum passage 38 at a section between the throttle opening device 18 and the port 39. That is, the two vacuum-operated devices 18 and 24 are connected to the port 21 of the intake passage 22 in parallel with each other in contrast to the series connection in the warm-up system according to the invention. In principle, the two devices 18 and 24 in the system of FIG. 2 are actuated simultaneously, but in practice they are liable to come into action individually in an unpredictable sequence as described hereinbefore.

Figure 3:
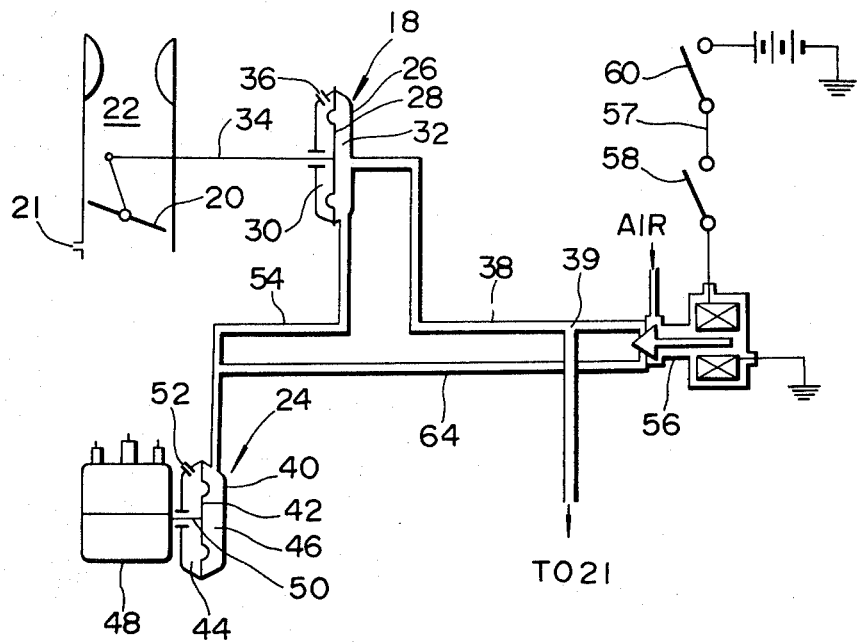
FIGS. 3, 4 and 5 are respectively diagrammatic illustrations of three modifications of the warm-up system of FIG. 1.

FIG. 3 shows a slight modification of the warm-up system of FIG. 1. As a sole difference of the warm-up system of FIG. 3 from the system of FIG. 1, there is an air-admitting passage 64 which branches off from the vacuum passage 54 between the two vacuum-operated devices 18 and 24, and the electromagnetic valve 56 is designed and arranged such that the communication of this passage 64 with the atmosphere is blocked simultaneously with closing of the port 39 of the vacuum passage 38 and is re-established simultaneously with opening of the port 39.

At this time of actuation of the throttle opening device 18 and the ignition timing retarding device 24 by the application of the intake vacuum, the existence of the air-admitting passage 64 produces no difference in the sequence of the actuation of the two devices 18 and 24. However, when the electromagnetic valve 56 is deenergized, the passage 64 has the effect of applying the atmospheric pressure to the ignition timing retarding device 24 without passing through the throttle opening device 18. As a consequence, a normal ignition timing is resumed synchronously with reverting of the throttle opening degree to the normal degree. This is favorable for ensuring of stable operation of the engine 16.

Figure 4:
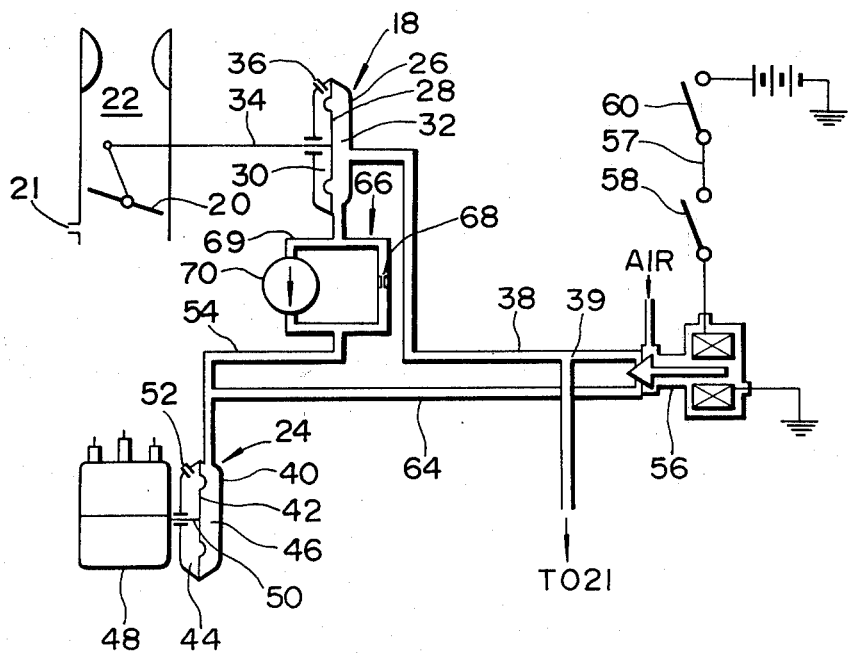

Referring to FIG. 4, there is shown a warm-up system different from the warm-up system of FIG. 3 in that delay means 66 is provided in the vacuum passage 54 at a section between the throttle opening device 18 and the junction of the vacuum passage 54 and the air-admitting passage 64 in order to further ensure the delay in the application of the intake vacuum to the ignition timing retarding device 24. The delay means 66 is a combination of an orifice 68 formed in the vacuum passage 54 so as to limit the flow rate of air passing through the vacuum passage 54 in the direction from the ignition timing retarding device 24 toward the throttle opening device 18, a bypass 69 bypassing the orifice 68, and a check valve 70 disposed in the bypass 69 so as to permit air to flow through the bypass 69 only in the direction from the throttle opening device 18 toward the ignition timing retarding device 24.

When the electromagnetic valve 56 is actuated, the check valve 70 blocks the flow of air from the vacuum chamber 46 through the bypass 69 and therefore the air flows to the vacuum chamber 32 through the orifice 68 only. Accordingly, the intake vacuum is applied to the ignition timing retarding device 24 with an adequate delay after the application to the throttle opening device 18 to thereby further ensure that the latter device 18 is actuated earlier than the former device 24 to an allowable extent.

When the electromagnetic valve 56 is deenergized, the presence of the delay means 66 does not affect quickness of the termination of the operation of the ignition timing retarding device 24, because air from the vacuum chamber 32 can flow through the check valve 70 in the bypass 69 and furthermore because the air-admitting passage 64 becomes effective.

The delay means 66 may alternatively be located between the vacuum chamber 46 and the junction of the passage 54 and the air-admitting passage 64. Of course, the delay means 66 can also be provided to the vacuum passage 54 of the warm-up system of FIG. 1.

The manner of arrangement of the orifice 68 and the check valve 70 in the delay means 66 in FIG. 4 is merely by way of example, and may be modified in various ways. As another example, FIG. 6 contains a similarly functioning delay means 66A constituted of a check valve 70A similar in function to the check valve 70 in FIG. 4 and a flow rate restricting orifice 68A which is formed through or in series with the check valve 70A.

Figure 5:
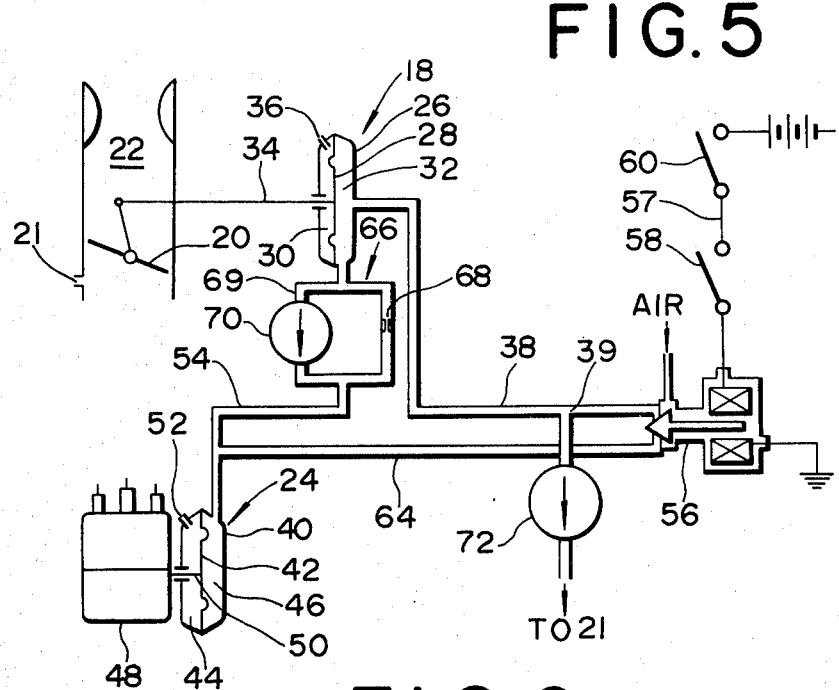

A warm-up system of FIG. 5 differs from the warm-up system of FIG. 4 only in that a check valve 72 is arranged in the vacuum passage 38 at a section between the port 39 and the intake passage 22 so as to permit the flow of air through this passage 38 only in the direction from the vacuum chamber 32 toward the intake passage 22.

During operation of this warm-up system, even if the intake vacuum in the intake passage 22 becomes weaker than the vacuum in the vacuum chamber 32 by reason of reduction in the engine speed or from any other cause, the check valve 72 prevents a gas flowing from the intake passage 22 into the vacuum chambers 32 and 46. Accordingly, the vacuum in the vacuum chambers 32 and 46 does not become weak and, hence, there occurs practically no change in the function of the warm-up system.

It will be understood that this check valve 72 can be included in the warm-up systems of FIGS. 1 and 3, too.

The time necessary for warm-up of the catalytic converter 12 becomes shorter as the atmospheric temperature becomes higher, because the temperature of the exhaust gas becomes higher as the atmospheric temperature becomes higher.

Accordingly, it is desirable to provide the throttle opening device 18 and the ignition timing retarding device 24 with temperature compensation means which automatically adjusts the extent of the increase in the throttle opening degree and the extent of the retardation of the ignition timing as the atmospheric temperature varies.

Figure 6:
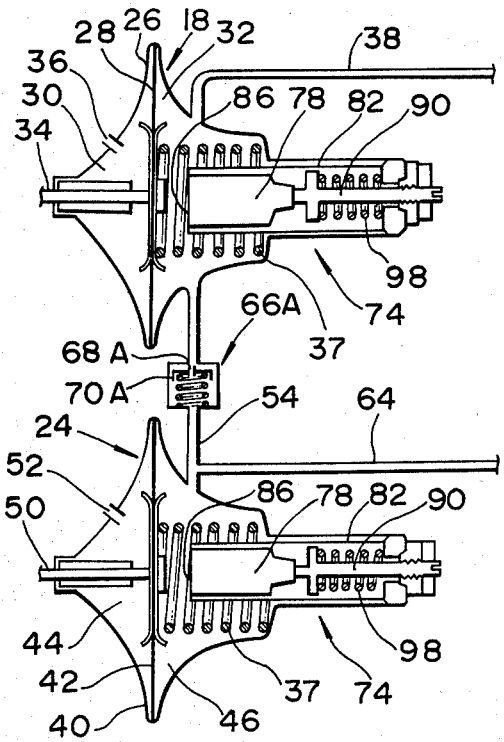
FIG. 6 is a sectional view of two vacuum-operated devices used in the warm-up system according to the invention.

FIG. 6 illustrates an example of such temperature compensation means, indicated generally at 74. Each of the throttle opening device 18 and the ignition timing retarding device 24 includes a stopper 78 which limits the extent of the deflection of the diaphragm 28 (or 42) toward the vacuum chamber 32 (or 46) to the predetermined degree. Essentially, this stopper 78 is a temperature-sensitive mass which is disposed in a casing 82 extending from the housing 26 (with respect to the throttle opening device 18) into the vacuum chamber 32 and has a free end 86 facing the diaphragm 28. The temperature-sensitive mass 78 is supported by an adjusting screw 90 which extends from the outside of the housing 26 into the casing 82. The temperature-sensitive mass 78 is of a material which expands as the atmospheric temperature becomes higher, so that the distance between the end face 86 and the diaphragm 28 becomes shorter as the atmospheric temperature becomes higher, and contracts as the atmospheric temperature becomes lower, so that the aforementioned distance increases as the atmospheric temperature lowers. A spring 98 is disposed in the casing 82 so as to prevent shaky movement of the temperature-sensitive mass 78. The initial position of the temperature-sensitive mass 78 can be adjusted by turning the adjusting screw 90. The temperature compensation means 74 in the ignition timing retarding device 24 is constructed and arranged in the same manner as the temperature compensation means 74 in the throttle opening device 18. A return spring 37 is disposed in the vacuum chamber 32, 46 of each vacuum-operated device 18, 24 to bias the diaphragm 28, 42 toward the atmospheric chamber 30, 44. In FIGS. 1 to 5, illustration of the spring 37 is omitted for simplification.

During operation of the warm-up system, when the atmospheric temperature is high, the extent of the increase in the throttle opening degree becomes relatively small because of expansion of the temperature-sensitive mass 78 of the device 18 and the extent of the retardation of the ignition timing becomes relatively small because of expansion of the temperature-sensitive mass 78 of the device 24. This is favorable to the operation of the engine 16. When the atmospheric temperature is low, the extent of the increase in the throttle opening degree becomes relatively great because of contraction of the temperature-sensitive mass 78 of the device 18 and the extent of the retardation of the ignition timing becomes relatively great because of contraction of the temperature-sensitive mass 78 of the device 24. As a consequence, the time necessary for warm-up of the catalytic converter 12 does not lengthen undesirably.

What is claimed is:

1. A system for rapidly warming up a catalytic converter provided to an exhaust passage of an internal combustion engine in an automobile to purify the exhaust gas, the engine including an intake passage with a throttle valve therein, the system comprising:

throttle opening means for increasing the opening degree of the throttle valve by a predetermined degree when a vacuum is applied to said throttle opening means;

ignition timing retarding means for retarding the ignition timing of the engine to a predetermined extent when a vacuum is applied to said ignition timing retarding means;

a vacuum passage which connects said ignition timing retarding means to the intake passage at a section downstream of the throttle valve via said throttle opening means;

an electromagnetic valve provided to said vacuum passage at a section between the intake passage and said throttle opening means such that an intake vacuum produced in the intake passage by the operation of the engine is applied through said vacuum passage to said throttle opening means and said ignition timing retarding means while said electromagnetic valve is electrically actuated;

an engine-temperature switch which is included in a circuit for actuation of said electromagnetic valve and operates when the temperature of the engine is below a predetermined temperature; and a gear-position switch which is included in said circuit and operates in response to the neutral position of a transmission of the engine, said engine-temperature switch and said gear-position switch being connected with each other such that said electromagnetic valve is actuated when both said engine-temperature switch and said gear-position switch operate.

2. A system according to claim 1, wherein said throttle opening means comprises a flexible diaphragm and a vacuum chamber defined on one side of said diaphragm and connected to said section of the intake passage by said vacuum passage, said diaphragm being linked with the throttle valve such that the opening degree of the throttle valve increases by the predetermined degree when said diaphragm deflects toward said vacuum chamber by the action of the intake vacuum applied to said vacuum chamber, said ignition timing retarding means comprising a flexible diaphragm and a vacuum chamber defined on one side of the diaphragm and connected to said vacuum chamber of said throttle opening means by said vacuum passage, the diaphragm of said ignition timing retarding means being linked with an ignition timing control means for ignition of the engine such that the ignition timing is retarded to the predetermined extent when the diaphragm deflects toward the vacuum chamber in said ignition timing retarding means by the action of the intake vacuum applied to the vacuum chamber.

3. A system according to claim 2, further comprising an air-admitting passage which is so arranged as to provide direct communication of the vacuum chamber in said ignition timing retarding means with the atmosphere when said electromagnetic valve is not actuated.

4. A system according to claim 1, 2 or 3, further comprising delay means provided in said vacuum passage at a section between said throttle opening means and said ignition timing retarding means, said delay means being a combination of an orifice for limiting the flow rate of air passing through said vacuum passage in the direction from said ignition timing retarding means toward said throttle opening means and a check valve which permits air to flow therethrough only in the direction from said throttle opening means toward said ignition timing retarding means.

5. A system according to claim 1, further comprising a check valve arranged in said vacuum passage at a section between the intake passage and the position of said electromagnetic valve so as to permit the flow of gas only in the direction from said throttle opening means toward the intake passage.

6. A system according to claim 2, wherein said throttle opening means further comprises temperature-sensitive stopper means for varying the extent of the deflection of the diaphragm such that the extent of the increase in the opening degree of the throttle valve becomes smaller as the temperature of ambient air becomes higher, said ignition timing retarding means further comprising temperature-sensitive stopper means for varying the extent of the deflection of the diaphragm such that the extent of the retardation of the ignition timing becomes smaller as the temperature of ambient air becomes higher.

* * * * *